3,102,102
PRESSURE-SENSITIVE COMPOSITION COMPRISING A RUBBER, A TACKIFYING RESIN, A POLYAMINE, AND A PEROXIDE
Charles L. Weidner, Cranbury, and Winifred C. Collins, New Brunswick, N.J., assignors, by mesne assignments, to Johnson & Johnson, New Brunswick, N.J., a corporation of New Jersey
No Drawing. Filed Dec. 22, 1954, Ser. No. 477,132
18 Claims. (Cl. 260—4)

This invention relates to pressure-sensitive adhesives, and, more particularly, to pressure-sensitive adhesive tapes forming adhesive bonds to surfaces to which they are applied substantially greater than those heretofore obtained with similar adhesives.

The adhesion of a pressure-sensitive adhesive and tape formed therewith may be expressed by the hold characteristic of the adhesive mass, i.e., the ability of the tape to resist movement from the surface to which it is applied when subjected to a static load which tends to shear the adhesive mass. In conventional test procedures this characteristic of a pressure-sensitive adhesive is often determined by suspending a fixed weight from an end of a length of pressure-sensitive tape, a fixed area of the other end of which is adhered to a suitable surface. The weight is suspended in a manner which exerts a shearing force upon the adhesive at a suitable removal angle as, for example, 0° to 20° determined by placing the surface vertical or 20° from the vertical. The length of time until the weight drops is taken as an index of the hold characteristics of the adhesive mass under test. For ease of comparison the hold characteristics of an adhesive may be expressed relative to a control sample.

Hold characteristics superior to those obtained with a conventional rubber-resin pressure-sensitive adhesive have been obtained heretofore by procedures which involve partial cure of the elastomer component of such an adhesive with conventional rubber vulcanizing agents. The use of such types of curing agent is generally satisfactory but these processes require substantial expensive additional processing of the elastomer, and the necessary reactions are difficult to control to insure that the proper state of cure is reached without causing insolubility of the adhesive in ordinary rubber solvents and a substantial loss in the required characteristics of a normally tacky and pressure-sensitive adhesive.

Additionally, such additives are often objectionable in the adhesive formulation since they frequently cause stains when the adhesive mass is applied to light colored surfaces. Obviously, such staining renders a pressure-sensitive tape formed therewith unsuitable for many commercial applications, for example, as masking tape for surfaces of white household appliances, light colored automobile bodies, etc.

In my copending application with J. F. McElroy, Serial No. 354,882, filed May 13, 1953, now U.S. Patent No. 3,004,867, there are described pressure-sensitive adhesives which exhibit hold characteristics substantially better than conventional pressure-sensitive adhesives and yet do not exhibit the undesirable staning characteristics heretofore described. In application Serial No. 354,882, pressure-sensitive adhesives with such improved characteristics are obtained by the addition of minor proportions of certain di- or polyamines to rubber based, normally tacky and pressure-sensitive adhesives. As indicated in the aforementioned application the adhesives formed in accordance with that invention exhibit hold characteristics up to ten times better than those exhibited by conventional pressure-sensitive adhesives without such additions.

By use of the invention described herein, even more striking improvements may be obtained in the hold characteristics of normally tacky and pressure-sensitive adhesives. In accordance with this invention minor amounts of the di- or polyamines described in our aforementioned application are substantially uniformly dispersed in a rubber based pressure-sensitive adhesive, in conjunction with small amounts of a suitable organic or inorganic peroxide. As in the case of our prior development, the amines and peroxides may be added at any convenient stage of the preparation of the pressure-sensitive adhesive, provided proper precautions are taken to insure a uniform dispersion of the ingredients. The amines and peroxides may be added simultaneously or in separate stages depending only upon the convenience of the compounding procedure. These materials may be added, for example, in an internal mixer of the Banbury type, with solvent in a Baker-Perkins mixer, or to a solution of the adhesive by means of a simple paddle stirrer.

Suitable di- or polyamines for use in this invention are those having a formula of:

$$NH_2RNH_2$$

wherein R is a radical having from one to eighteen carbon atoms selected from the group of straight saturated unsubstituted hydrocarbon chains, straight saturated substituted hydrocarbon chains, unsubstituted iminohydrocarbon chains and salts of said compounds, and salts of such amines; and mixtures of such compounds.

As is apparent, these formulations include such amines as ethylene diamine, tetraethylene pentamine, and more complex compounds of this nature, but exclude compounds such as butylamine, p-phenylene diamine and diphenyl p-phenylene diamine, as well as those of the cystine and lysine types. In embodiments of the invention amines such as the above and dihydrazine oxalate ($NH_2$—$NH_3$—OOC—COO—$NH_3$—$NH_2$); 1-3-diamino-2-propanol; ($NH_2CH_2$)$_2$CHOH; 3-3 imino bispropylamine, $NH(CH_2CH_2CH_2NH_2)_2$, propylene diamine ($CH_3CH(NH_2)CH_2NH_2$), hexamethylene diamine, triethylene tetramine, tetraethylene pentamine borate, hydrazine borate, etc., are employed since these compounds exhibit beneficial adhesion-promoting properties.

When such amines are added to rubber-based pressure-sensitive adhesives in conjunction with suitable amounts of an inorganic or organic peroxide, the adhesive so formed exhibits hold characteristics as much as fifteen times greater than those of a conventional pressure-sensitive adhesive and as much as five times greater than those of an adhesive to which has been added an amine alone. Conventional organic and inorganic peroxides will contribute the effect desired in the adhesive. Examples of such peroxides, and those preferred for use in this invention, include zinc peroxide, magnesium peroxide, cumene hydroperoxide, benzoyl peroxide, hydrogen peroxide, diisopropyl benzene hydroperoxide, etc., and mixtures thereof.

Varying amounts of one or more suitable amines and peroxides may be employed in adhesive formulations to obtain the benefits of this invention. The optimum amounts of each additive are, obviously, dependent upon the particular conventional elastomeric and resinous components and additive compounds employed in the composition. The amines are normally present in the adhesive formulation in minor amounts, totalling approximately one hundredth of one percent to five percent by weight of adhesive solids and preferably approximately 0.5 to 2.0% by weight thereof are employed. The peroxides are also employed in relatively minor amounts and one or more peroxides in amount approximately 0.5 to 6% weight of the adhesive solids may be used. For best results peroxides in amount totalling approximately 1.0 to 3.0% by weight are preferred.

The following are examples of normally tacky pressure-sensitive adhesives formed in accordance with this invention and having the improved hold characteristics heretofore described. In the examples all parts indicated are by weight unless otherwise stated.

EXAMPLE I

A normally tacky and pressure-sensitive adhesive was formed from a composition of:

| | Parts |
|---|---|
| Pale crepe rubber | 50 |
| Hydrated alumina | 24 |
| Polyterpene resin (M.P. 115° C.) | 25 |
| Alkylated phenol | 1 | by solvating the rubber and resinous components in a suitable solvent such as toluene in an internal mixer and then dispersing the remaining materials through the mass formed. Twelve individual portions of the adhesive so formed were then provided. Individual test adhesives were formed by substantially uniformly dispersing throughout the mass particular amines and mixtures of peroxides and amines and the adhesives thus formed tested in the manner heretofore indicated for their hold characteristics. In the following table the sample designator, particular additives employed in percent by weight of the adhesive, and the hold characteristics (expressed as relative adhesion based on the control sample) of each of the samples are given:

| Sample | Additive | Relative adhesion |
|---|---|---|
| A | None (Control) | 1 |
| B | 0.5% Triethylene tetramine | 2.9 |
| C | 0.5% Triethylene tetramine and 1.0% Cumene hydroperoxide | 14.1 |
| D | 0.5% Butylamine | 1 |
| E | 0.5% Butylamine and 1.0% Cumene hydroperoxide | 1 |
| F | 0.5% Hexamethylene diamine | 4.1 |
| G | 0.5% Hexamethylene diamine and 1.0% Cumene hydroperoxide | 14.1 |
| H | 0.5% Triethylene tetramine and 1.0% Zinc peroxide | 4.1 |
| I | 0.5% Triethylene tetramine and 1.0% Benzoyl peroxide | 3.5 |
| J | 0.5% Triethylene tetramine and 1.0% Di-isopropyl benzene peroxide | 4.7 |

From the foregoing it may be seen that in all instances where minor amounts of a suitable amine and an inorganic or organic peroxide are added to a conventional pressure-sensitive adhesive, substantial improvement in the hold characteristics of the adhesive thus formed is obtained. As indicated by a comparison of samples A, D and E, however, the test results indicate clearly that amines without the generic formula hereinbefore set forth do not improve the hold characteristics of an adhesive formed therewith, and that the use of a suitable peroxide in conjunction with such an amine does not improve the characteristics of the adhesive. It is also apparent from the foregoing data that the most striking improvement in hold characteristics is obtained when the adhesive formulation includes an aliphatic acyclic polyamine having a plurality of primary amine groups, in conjunction with an aromatic organic peroxide, particularly cumene hydroperoxide. Such additive combinations are preferred because they are economical and provide outstanding results.

EXAMPLE II

As an example of the applicability of this invention to an adhesive formulation containing elastomer components other than natural rubber, an adhesive composition of:

| | Parts |
|---|---|
| Elastomeric polymer of polyethyl acrylate | 500 |
| Formaldehyde condensate of toluene sulfonamides, 80% solids in butyl acetate | 750 |
| Condensation product of dimethoxyethyl phthalate | 150 | was formed by solvating the components in a suitable solvent such as toluene in an internal mixer. Three samples of the adhesive mass thus formed were provided. No addition was made to sample A and this sample was used as a control. To sample B was added approximately 0.5% by weight on the adhesive solids, of tetraethylene pentamine and the amine substantially uniformly dispersed through the mass. In similar manner, 0.5%, by weight on the adhesive solids of tetraethylene pentamine and 1.0% cumene hydroperoxide were added separately to sample C. The adhesives formed were tested for their hold characteristics and exhibited the following results:

| | Relative adhesion |
|---|---|
| Sample A (control) | 1 |
| Sample B | 4.0 |
| Sample C | 8.0 |

EXAMPLE III

Similar benefits are obtainable by the use of this invention in the formation of improved adhesives based on mixed elastomers. As illustrative of this fact, an adhesive was formulated of:

| | Parts |
|---|---|
| GR-S X1022 (copolymer of about 76% butadiene and 24% styrene, Mooney viscosity 78) | 14 |
| Light tube reclaim (60% rubber hydrocarbon) | 20 |
| Smoked sheet crude rubber | 8 |
| Zinc oxide | 20 |
| Refined petroleum process oil, S.C. 945 | 5 |
| Polyterpene resin (M.P. 70° C.) | 25 |
| Di-tertiary butyl p-cresol | 1 |

Three samples of the adhesive mass were provided. No addition was made to sample A and this sample served as a control. To sample B was added approximately 0.5% by weight of tetraethylene pentamine and the amine substantially uniformly dispersed throughout the mass. In similar manner approximately 0.5% of tetraethylene pentamine and then 1.0% of hydrogen peroxide, by weight of the adhesive, was added to sample C. When tested the adhesives thus formed exhibited the following characteristics:

| | Relative adhesion |
|---|---|
| Sample A (control) | 1 |
| Sample B | 6.7 |
| Sample C | 13.3 |

EXAMPLE IV

To show the effect of the use of varying amounts of amines and peroxides upon the hold characteristics of an adhesive mass containing these components a number of adhesive samples were prepared from a formulation of:

| | Parts |
|---|---|
| Pale crepe rubber | 600 |
| Hydrated alumina | 285 |
| Polyterpene resin (M.P. 115° C.) | 500 |

In the following tables are given the hold characteristics (in relative adhesion) of adhesives formed by the addition, to these samples, of the various amines and peroxides indicated, in the amounts indicated.

Table A

| | Percent hexamethylene diamine | | | |
|---|---|---|---|---|
| | 0% | 0.25% | 0.75% | 1.0% |
| No peroxide | 1 | | | |
| 2% benzoyl peroxide | | 3.3 | 2.5 | 3.0 |
| 2% magnesium peroxide | | 10 | 7 | 6 |

Table B

| | Percent cumene hydroperoxide | | | | | |
|---|---|---|---|---|---|---|
| | 0% | 0.5% | 1.0% | 2.0% | 4.0% | 6.0% |
| 0.5% tetraethylene pentamine | 1 | 1.8 | 2.3 | 4.0 | 3.0 | 1.3 |

From the foregoing examples it may be seen that adhesives formed in accordance with this invention exhibit improved hold characteristics not heretofore obtained with conventional pressure-sensitive adhesive formulations and not obtained with adhesives formulated including the use of suitable amines alone. It is to be appreciated that the invention is not considered limited to the specific adhesive formulations set forth in the examples. The concept of this invention is applicable to all conventional pressure-sensitive adhesives having similar characteristics to those exemplified. For example, and without limitation, the invention has been found suitable for use in adhesives based on rubbers or elastomers such as natural rubber, conventional copolymers of butadiene and styrene, reclaimed rubbers, polyethyl acrylates, and combinations of the foregoing materials in varying amounts.

In the formation of pressure-sensitive adhesive tapes employing the improved adhesives of this invention, the adhesive may be applied in conventional manner to any conventional backing for such tapes such as paper, cloth, non-fibrous films (e.g. cellophane, vinyl resins, polyethylene, etc.) etc. If desired the backing may be provided with a suitable conventional priming coating to improve the adherence of the adhesive thereto. Suitable primer coatings, for example, are those exemplified in the patent to Bemmels, No. 2,647,843, issued August 4, 1953. The adhesives are preferably applied to the desired backing from solvent solution or dispersion using aliphatic or aromatic solvents with or without heat spreading and subsequent drying. The coaters used may be any of those suitable for the characteristics of the mass condition and may be a hot melt spreader, calender, reverse roll coater, knife or kiss coater, etc.

It will be appreciated that many variations in the invention described herein may become apparent to those skilled in the art to which this invention applies. It is to be appreciated that such variations are within the concept of the invention described herein and the invention is to be considered limited only by the appended claims.

What is claimed is:

1. A normally tacky and pressure-sensitive adhesive composition, having improved hold characteristics which comprises a rubber selected from the group consisting of natural rubber and the rubber copolymers of butadiene and styrene, a compatible tackifying resin, and a minor amount of hold improving compounds, one of which is present in amount approximately one-hundredth of one percent to five percent by weight of the composition and is a compound selected from the group consisting of compounds of the formula:

$$NH_2RNH_2$$

wherein R is a radical having from one to eighteen carbon atoms selected from the group of straight saturated unsubstituted hydrocarbon chains, straight saturated substituted hydrocarbon chains, unsubstituted imino-hydrocarbon chains, and acid salts of said compounds, and the other of which is present in amount approximately 0.5 to 6% by weight of the composition, and is a compound selected from the group consisting of organic and inorganic peroxides.

2. An adhesive composition according to claim 1 wherein the hold improving amine comprises an aliphatic acyclic polyamine having a plurality of primary amine groups.

3. An adhesive composition according to claim 1 wherein the hold improving amine comprises triethylene tetramine.

4. An adhesive composition according to claim 1 wherein the hold improving amine comprises hexamethylene diamine.

5. An adhesive composition according to claim 1 wherein the hold improving amine comprises tetraethylene pentamine.

6. An adhesive composition according to claim 1 wherein the hold improving peroxide comprises an aromatic organic peroxide.

7. An adhesive composition according to claim 1 wherein the hold improving peroxide comprises cumene hydroperoxide.

8. An adhesive composition according to claim 1 wherein the hold improving peroxide comprises zinc peroxide.

9. An adhesive composition according to claim 1 wherein the hold improving compounds comprise an aliphatic acyclic polyamine having a plurality of primary amine groups, and an aromatic organic peroxide.

10. A normally tacky and pressure-sensitive adhesive tape, comprising a backing having coated on one side thereof an adhesive composition having improved hold characteristics which comprises a rubber selected from the group consisting of natural rubber and the rubber copolymers of butadiene and styrene, a compatible tackifying resin, and a minor amount of hold improving compounds, one of which is present in amount approximately one-hundredth of one percent to five percent by weight of the composition and is a compound selected from the group consisting of compounds of the formula:

$$NH_2RNH_2$$

wherein R is a radical having from one to eighteen carbon atoms selected from the group of straight saturated unsubstituted hydrocarbon chains, straight saturated substituted hydrocarbon chains, unsubstituted imino-hydrocarbon chains, and acid salts of said compounds, and the other of which is present in amount approximately 0.5 to 6% by weight of the composition, and is a compound selected from the group consisting of organic and inorganic peroxides.

11. An adhesive tape according to claim 10, wherein the hold improving amine comprises an aliphatic acyclic polyamine having a plurality of primary amine groups.

12. An adhesive tape according to claim 10, wherein the hold improving amine comprises triethylene tetramine.

13. An adhesive tape according to claim 10, wherein the hold improving amine comprises hexamethylene diamine.

14. An adhesive tape according to claim 10, wherein the hold improving amine comprises tetraethylene pentamine.

15. An adhesive tape according to claim 10, wherein the hold improving peroxide comprises an aromatic organic peroxide.

16. An adhesive tape according to claim 10, wherein the hold improving peroxide comprises cumene hydroperoxide.

17. An adhesive tape according to claim 10, wherein the hold improving peroxide comprises zinc peroxide.

18. An adhesive tape according to claim 10, wherein the hold improving compounds comprise an aliphatic acyclic polyamine having a plurality of primary amine groups, and an aromatic organic peroxide.

References Cited in the file of this patent

UNITED STATES PATENTS

| | | |
|---|---|---|
| 2,136,373 | Busse | Nov. 15, 1938 |
| 2,206,448 | Busse | July 2, 1940 |
| 2,397,774 | Buckley | Apr. 2, 1946 |
| 2,567,988 | Bethe | Sept. 18, 1951 |
| 2,576,968 | Pike et al. | Dec. 4, 1951 |
| 2,577,432 | Provost | Dec. 4, 1951 |
| 2,606,893 | Reynolds et al. | Aug. 12, 1952 |